(12) United States Patent
Pimenta

(10) Patent No.: US 11,746,220 B2
(45) Date of Patent: Sep. 5, 2023

(54) HIGH FLOW ROTOMOLDING COMPOSITIONS, PROCESSES THEREOF, AND ARTICLES THEREFROM

(71) Applicant: Braskem S.A., Camaçari (BR)

(72) Inventor: Eliomar Ricardo Pimenta, São Paulo (BR)

(73) Assignee: Braskem S.A., Camaçari (BR)

( * ) Notice: Subject to any disclaimer, the term of this patent is extended or adjusted under 35 U.S.C. 154(b) by 191 days.

(21) Appl. No.: 16/900,223

(22) Filed: Jun. 12, 2020

(65) Prior Publication Data

US 2021/0388190 A1    Dec. 16, 2021

(51) Int. Cl.
| | |
|---|---|
| *B29C 41/00* | (2006.01) |
| *B29C 41/04* | (2006.01) |
| *C08L 23/08* | (2006.01) |
| *B29L 31/00* | (2006.01) |
| *B29L 31/30* | (2006.01) |
| *B29K 23/00* | (2006.01) |
| *B29L 31/44* | (2006.01) |

(52) U.S. Cl.
CPC ........ *C08L 23/0815* (2013.01); *B29C 41/003* (2013.01); *B29C 41/04* (2013.01); *B29K 2023/08* (2013.01); *B29L 2031/3011* (2013.01); *B29L 2031/44* (2013.01); *B29L 2031/7172* (2013.01); *C08L 2205/025* (2013.01); *C08L 2207/062* (2013.01); *C08L 2207/066* (2013.01); *C08L 2314/02* (2013.01)

(58) Field of Classification Search
CPC ............... C08L 23/08; C08L 23/0815; C08L 2205/025; B29C 41/003; B29C 41/04; B29K 2023/08
See application file for complete search history.

(56) References Cited

U.S. PATENT DOCUMENTS

| | | |
|---|---|---|
| 5,530,055 A | 6/1996 | Needham |
| 5,532,282 A | 7/1996 | Needham |
| 7,153,909 B2 | 12/2006 | Van Dun et al. |
| 8,907,018 B2 | 12/2014 | Bellehumeur et al. |
| 10,023,706 B2 | 7/2018 | Bellehumeur et al. |
| 2015/0259519 A1* | 9/2015 | Wang ............... B65D 43/16 215/316 |
| 2021/0102050 A1* | 4/2021 | Bellehumeur ...... C08L 23/0815 |

FOREIGN PATENT DOCUMENTS

| | | |
|---|---|---|
| AU | 4861900 A | 1/2001 |
| CA | 2118347 A1 | 4/1995 |
| CN | 1247681 C | 3/2006 |
| CN | 101265343 B | 8/2010 |
| CN | 101260209 B | 7/2011 |
| CN | 103665528 B | 12/2015 |
| CN | 106554535 A | 4/2017 |
| CN | 106750723 A | 5/2017 |
| CN | 109721809 A | 5/2019 |
| EP | 0087204 A1 | 8/1983 |
| JP | S60177046 A | 9/1985 |
| JP | 2001089615 A | 4/2001 |
| JP | 2012214781 A | 11/2012 |
| KR | 20190063829 A | 6/2019 |
| WO | 9300400 A1 | 1/1993 |
| WO | 200040386 A1 | 7/2000 |
| WO | 200270602 A3 | 12/2002 |
| WO | 200391294 A1 | 11/2003 |
| WO | 200509714 A1 | 2/2005 |
| WO | 2006136572 A1 | 12/2006 |
| WO | 200767259 A1 | 6/2007 |
| WO | 201571807 A1 | 5/2015 |
| WO | 201655959 A1 | 4/2016 |
| WO | 201675164 A1 | 5/2016 |
| WO | 201798359 A1 | 6/2017 |
| WO | 2019126845 A1 | 7/2019 |

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

Compositions may include a polymer melt blend composition prepared from two polyethylene copolymers having different densities, wherein the polymer melt blend composition possesses improved flowability and impact resistance for low thickness rotomolding applications. Low thickness articles may include a polymer melt blend composition prepared from two polyethylene copolymers having different densities, wherein the articles possess improved finishing properties. Rotomolding processes may include melt blending from two polyethylene copolymers having different densities, pulverizing the melt blend, and rotational molding the composition thereof.

18 Claims, 4 Drawing Sheets

HIGH FLOW ROTOMOLDING COMPOSITIONS, PROCESSES THEREOF, AND ARTICLES THEREFROM

BACKGROUND

Rotomolding, or rotational molding, is an industrial process for the production of plastic parts by shaping and molding thermoplastics at a certain temperature. During the rotomolding process, a thermoplastic material, generally in a powder form, is placed into a mold cavity in an amount sufficient to produce a product having a desired thickness. The mold is then closed, heated, and rotated vertically and horizontally, which results in the thermoplastic softening and forming to the wall of the mold. Examples of thermoplastics that may be used in rotomolding include polyolefins such as polyethylene and polypropylene.

Rotomolding may be used to produce hollow articles. These articles may range from simple parts to very complex products that may be produced efficiently and with a low manufacturing cost, as compared to other processes such as thermoforming, injection molding, and blow molding. In particular, the types of articles that may be prepared using rotomolding include containers, toys, playground equipment, packaging supplies, medical products, and even very large products, such as silos or high capacities tanks to be used in the agricultural, chemical, and recreational vehicle industries.

Several characteristics are important for rotomolding plastics including high flow characteristics and end product strength properties (e.g., impact strength and environmental stress cracking resistance) and surface finish in order to produce complex parts as well as unique articles and products. In particular, the rotomolding of articles and parts having complex angles requires using materials with high flow characteristics in order to facilitate the filling of these angular portions in the mold. These requirements are also important for the rotomolding of low thickness parts and articles. While polyethylene and polyethylene blends have been developed for use in rotomolding processes, there still exists a need for high flow rotomolding compositions affording improved processability and surface appearance combined with low warpage and good mechanical properties such as impact strength and environmental stress cracking resistance in particular for the production of low thickness articles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to a polymer melt blend composition that includes a first polyethylene copolymer having a density, measured according to ASTM D792, of from about 0.935 g/cm$^3$ to about 0.940 g/cm$^3$, a melt flow index, measured according to ASTM D1238 at 190° C./2.16 kg, of from about 3 g/10 min to about 8 g/10 min, and a molecular weight distribution Mw/Mn greater than 3, wherein the first polyethylene copolymer is present at a concentration of from about 70% by weight to about 95% by weight of the polymer melt blend composition; and a second polyethylene copolymer having a density, measured according to ASTM D792, of from about 0.924 g/cm$^3$ to about 0.934 g/cm$^3$, a melt flow index, measured according to ASTM D1238 at 190° C./2.16 kg, of at least about 17 g/10 min, and a molecular weight distribution Mw/Mn greater than 3, wherein the second polyethylene copolymer is present at a concentration of from about 5% by weight to about 30% by weight of the polymer melt blend composition, wherein the polymer melt blend composition has a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C.

In other aspects, embodiments of the present disclosure are directed to rotomolding process comprising melt blending a first polyethylene copolymer, and a second polyethylene copolymer to form a polymer melt blend composition having a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C.; pulverizing the melt blend composition; and rotational molding the polymer melt blend composition.

In other aspects, embodiments of the present disclosure are directed to rotomolded articles having a thickness of from about 2 mm to about 4.5 mm and including a polymer melt blend composition having a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C.

In other aspects, embodiments of the present disclosure are directed to rotomolded articles including a polymer melt blend composition having a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C. and having improved surface finishing properties.

In other aspects, embodiments of the present disclosure are directed to rotomolded articles including a polymer melt blend composition having a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C. and used in automotive parts, an agricultural vehicle parts, tanks, furniture, or playgrounds.

Other aspects and advantages of the claimed subject matter will be apparent from the following description and the appended claims.

DETAILED DESCRIPTION

Figure 1:
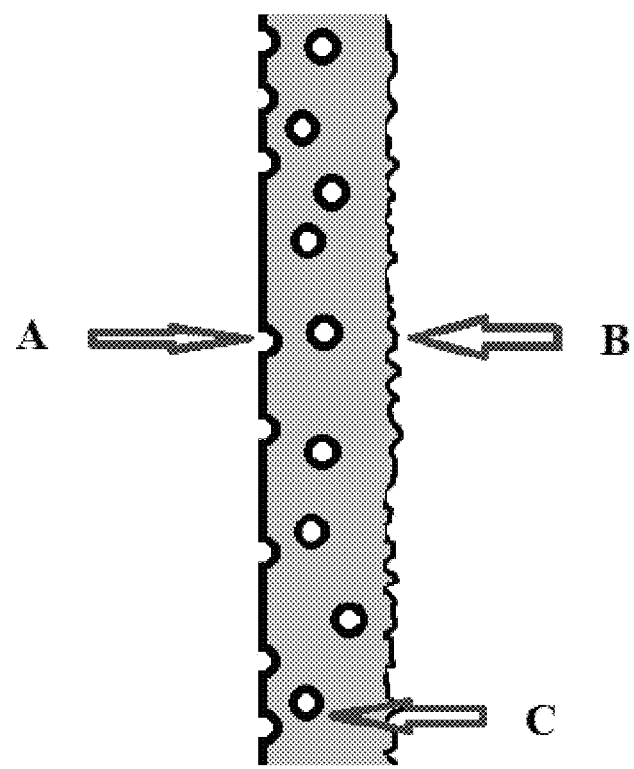
FIG. 1 is a schematic illustration of the visual appearance of the external surface A, of the internal surface B, and the appearance resulting from the bubble content in the core C between the external surface and the internal surface of an article prepared according to the present disclosure.
Figure 2A:
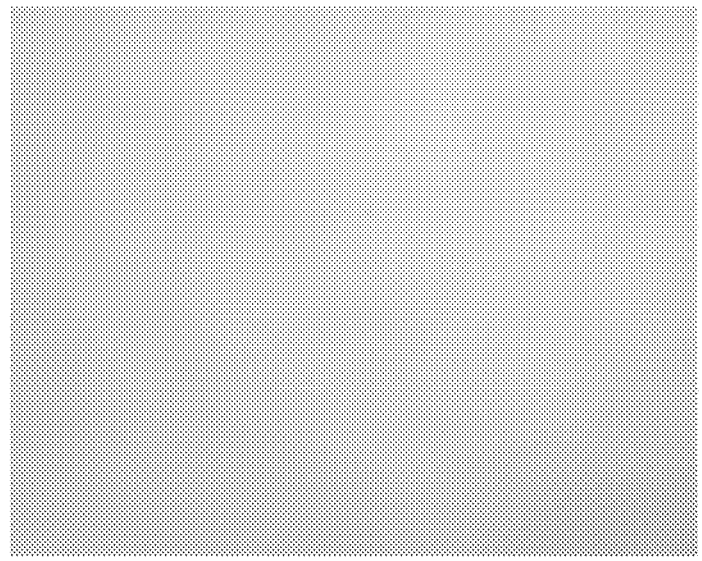
FIGS. 2A-2F are photographs showing stamped specimens showing internal surfaces of rotomolded articles having various amounts of defect illustrating the numerical standards 0-5 used in the visual evaluation of the internal surface of the articles prepared according to the present disclosure.
Figure 2B:
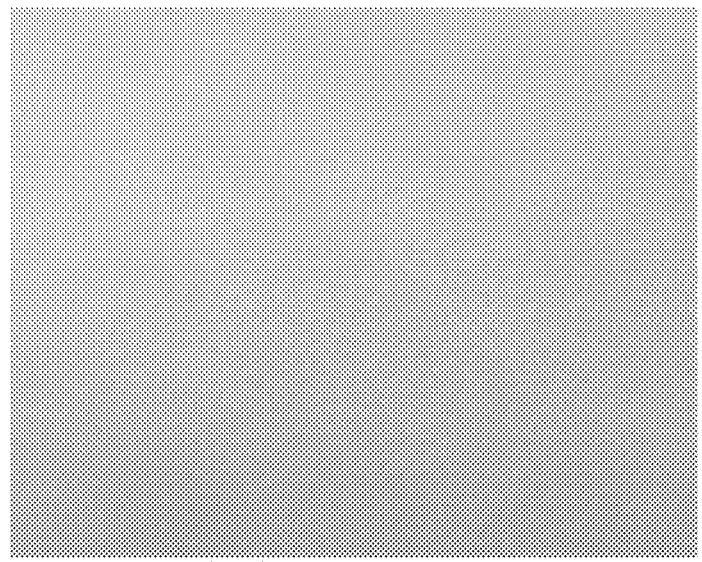
Figure 2C:
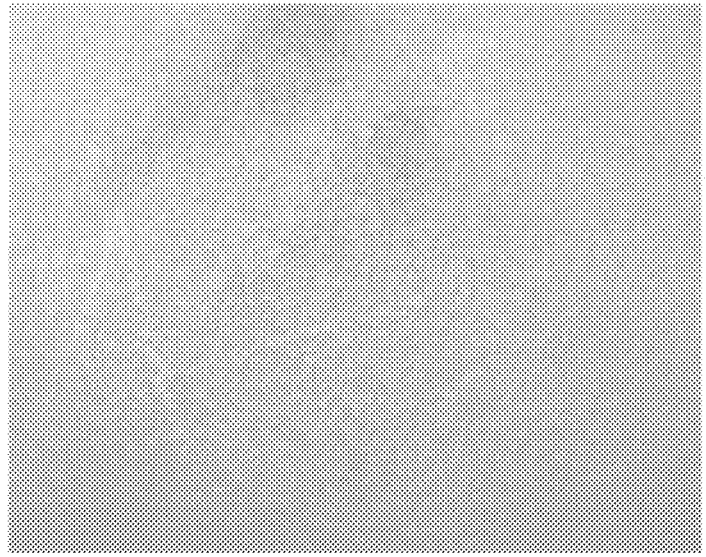
Figure 2D:
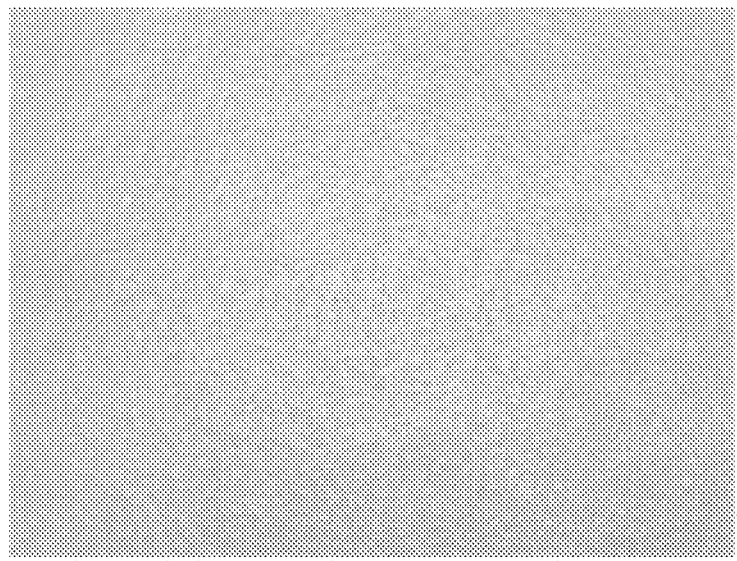
Figure 2E:
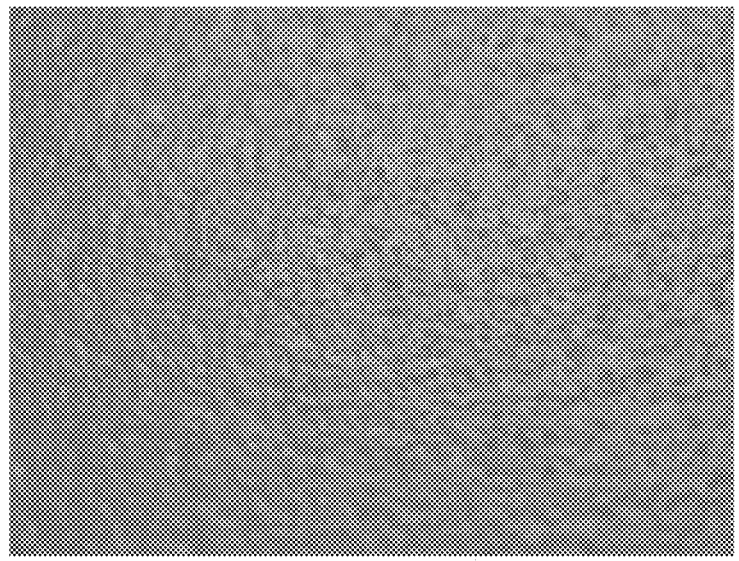
Figure 2F:
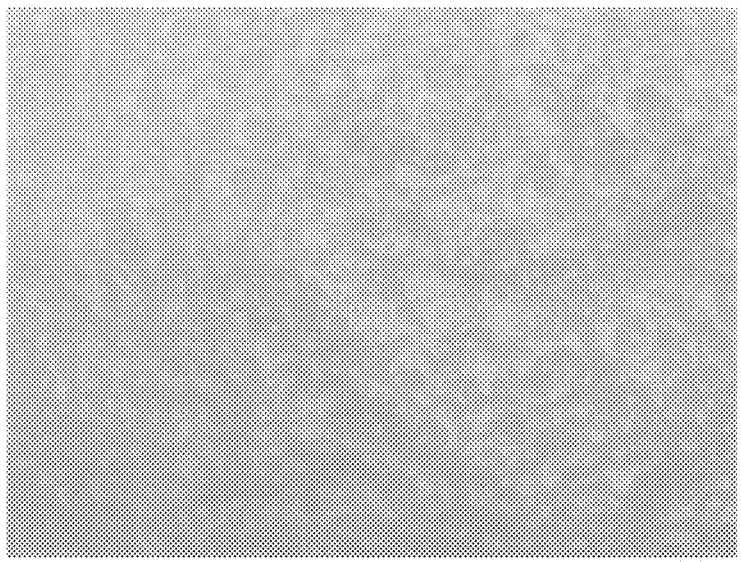

In one aspect, embodiments disclosed herein relate to polymer melt blend compositions containing a first polyethylene copolymer, such as a medium density linear polyethylene (MDLPE) copolymer, and a second polyethylene copolymer, such as a linear low density polyethylene (LLDPE) copolymer, where the polymer melt blend compositions have a balance of processability, e.g., polymer flow characteristics, and mechanical properties, such as impact strength, environmental stress cracking resistance, and flexural modulus. Conventionally, one type of property is sacrificed at the expense of the other, but for rotomolded parts, both processability and mechanical properties are needed. In particular, a high flowability for the melt blend composition allows the material to provide good filling and compaction in the mold, thus improving the rotomolding process, especially in the case of parts and articles having complex angles. In addition, polyethylene compositions with improved mechanical properties, including impact strength, allow the formation of articles possessing sufficient strength when subject to rough handling and repeated impact, an important property preventing the product from prematurely rupturing. More particularly, a high impact strength is especially important for rotomolded articles of low thickness. However, increasing the melt flow index and the density in a melt blend, which allows a higher flowability of the blend, is generally accompanied by a decrease in the impact strength of the resulting product. However, embodiments of the present disclosure use polymer melt blend compositions containing a mixture of MDLPE copolymer and a LLDPE copolymer, which provides for improvement in mechanical properties, such as impact resistance properties, in the formed articles without sacrificing flowability, making those articles particularly suitable for complex rotomolded parts of low thickness used in vehicles, containers, tanks, furniture or playgrounds, including but not limited to agricultural vehicles.

Embodiments of the present disclosure are directed to rotomolded articles formed from polymer melt blend compositions that include, as major component, a first polyethylene copolymer, such as an MDLPE copolymer, and, as minor component, a second polyethylene copolymer, such as an LLDPE copolymer, having a high melt flow index, resulting in polymer blend compositions having a high melt flow index and a high impact resistance. An advantage of using a melt blended polyethylene composition in accordance with the present disclosure is that, by taking advantage of the properties of different polyethylene copolymers, especially their density and melt flow index, an MDLPE copolymer can be selectively combined with an LLDPE copolymer in a melt blend to result in compositions having the desired properties. In particular, polymer melt blend compositions in accordance with the present disclosure may exhibit gains in impact resistance as well as resistance to bending and environmental stress cracking resistance, while also maintaining a high flowability, which is one of the necessary requirements to produce articles of low thickness using rotomolding.

In one or more embodiments, rotomolding processes and methods may be used to prepare articles by melt blending an MDLPE copolymer and an LLDPE copolymer having a high melt flow index to form a polymer blend compositions having a high melt flow index and a high impact strength, which is then rotationally molded into pre-selected molds to prepare articles of low thickness having excellent surface finishing and resistant to external impact and bending forces.

In one or more embodiments, polymer compositions may be used in the manufacturing of articles, including low thickness parts having more or less complex angles and portions useful in various vehicles, containers, tanks, and playgrounds.

First Polyethylene Copolymer

The first polyethylene copolymer of the polymer melt blend compositions of the present disclosure may be a medium density linear polyethylene copolymer derived from the polymerization of principally ethylene with a minor amount of one or more copolymerizable monomers. Suitable comonomers may include alpha-olefins, preferably $C_4$-$C_{20}$ alpha-olefins, preferably $C_4$-$C_8$ alpha-olefins, preferably $C_4$-$C_6$ alpha-olefins, preferably a $C_6$ alpha-olefin, preferably 1-hexene. In addition, the concentration of comonomer in the first polyethylene copolymer may be in a range having a lower limit selected from any of about 2.0%, about 2.5%, about 3.0%, and about 3.5% by weight of the first polyethylene copolymer to an upper limit selected from any of about 4.5%, about 5.0%, about 5.5%, and about 6.0% by weight of the first polyethylene copolymer, where any lower limit may be paired with any upper limit. The comonomer content is measured with NMR test.

The NMR tests were carried out in an Agilent 9.4 T magnet (100 MHz Larmor frequency for 13C nuclei) equipped with a OneNMR 5 mm probe. About 60 mg of polyethylene sample were diluted in 0.6 ml of a blend of 75%/25% (in vol.) 1,2-Dichlorobenzene (ODCB)/Trichloroethylene (TCE-d) solvent. All the experiments were carried out at 120° C. and 5000 scans were accumulated. The data were processed with the software VNMRJ and the chemical shift attribution and content calculation were in accordance with Randall work (Polymer Reviews, 29: 2, 201-317), for each respective copolymer.

Particularly improved end-product properties are obtained using such first polyethylene copolymer having a density, as measured according to ASTM D792, ranging from a lower limit selected from any of about 0.935 g/cm$^3$, about 0.936 g/cm$^3$, and about 0.937 g/cm$^3$ to an upper limit selected from any of about 0.938 g/cm$^3$, about 0.939 g/cm$^3$, and about 0.940 g/cm$^3$, where any lower limit may be paired with any upper limit.

Further, the first polyethylene copolymer has a melt flow index, measured according to ASTM D1238 at 190° C./2.16 kg, in a range having a lower limit selected from any of about 3.0 g/10 min, about 3.5 g/10 min, and about 4.0 g/10 min to an upper limit selected from any of about 6.0 g/10 min, about 7.0 g/10 min, and about 8.0 g/10 min, where any lower limit may be paired with any upper limit.

In addition, the first polyethylene copolymer of the polymer melt blend compositions has a molecular weight distribution (Mw/Mn, or "MWD," is obtained from the ratio between the weight average molecular weight (Mw) and the number average molecular weight (Mn) obtained by GPC), e.g., Mw/Mn greater than 3, or greater than 4 in one or more embodiments, with ranges having any upper limit being contemplated. In some embodiments, the Mw/Mn of the first polyethylene copolymer may be about 4.3. More particularly, the first polyethylene may have an Mw having a lower limit selected from any of about 75000 g/mol, about 77000 g/mol, and about 80000 g/mol to an upper limit selected from any of about 90000 g/mol, about 95000 g/mol, and about 100000 g/mol, where any lower limit may be paired with any upper limit. In some embodiments, the Mn of the first polyethylene copolymer may have a lower limit selected from any of about 10000 g/mol, about 12500 g/mol, and about 15000 g/mol to an upper limit selected from any of about 40000 g/mol, about 45000 g/mol, and about 50000 g/mol, where any lower limit may be paired with any upper limit. In some embodiments, the Mz of the first polyethylene copolymer may have a lower limit selected from any of about 250000 g/mol, about 300000 g/mol, and about 350000 g/mol to an upper limit selected from any of about 450000 g/mol, about 500000 g/mol, and about 550000 g/mol, where any lower limit may be paired with any upper limit.

The GPC experiments may be carried out by gel permeation chromatography coupled with triple detection, with an infrared detector IR5 and an eight-angle light scattering detector (Wyatt). A set of 4 mixed bed, 13 μm columns (Tosoh) may be used at a temperature of 140° C. The experiments may use a concentration of 1 mg/mL, a flow rate of 1 mL/min, a dissolution temperature and time of 160° C. and 60 minutes, respectively, an injection volume of 200 μL, and a solvent of trichlorium benzene stabilized with 100 ppm of BHT.

Industrial methods of producing the first polyethylene copolymer are well known in the art and may include reactor blend, gas phase, liquid phase (or solution), and slurry phase polymerization processes, either alone or in combination. Catalysts used in these processes may include Ziegler-Natta catalysts, and/or one or more single site catalysts, such as metallocenes.

Second Polyethylene Copolymer

The second polyethylene copolymer of the polymer melt blend compositions of the present disclosure may be a linear low density polyethylene copolymer derived from the polymerization of principally ethylene with a minor amount of one or more copolymerizable monomers. Suitable comonomers may include alpha-olefins, preferably $C_3$-$C_{20}$ alpha-olefins, preferably $C_3$-$C_8$ alpha-olefins, preferably $C_3$-$C_6$ alpha-olefins, preferably a $C_4$ alpha-olefin, preferably 1-butene. In addition, the concentration of comonomer in the second polyethylene copolymer may be in a range having a lower limit selected from any of about 4.5%, about 5.0%, about 5.5%, and about 6.0% by weight of the second polyethylene copolymer to an upper limit selected from any of about 9.0%, about 9.5%, about 10.0%, and about 10.5% by weight of the second polyethylene copolymer, where any lower limit may be paired with any upper limit. The comonomer content is measured with NMR test.

Particularly improved end-product properties are obtained using such second polyethylene copolymer having a density, as measured according to ASTM D792, ranging from a lower limit selected from any of about 0.924 g/cm$^3$, about 0.925 g/cm$^3$, and about 0.926 g/cm$^3$ to an upper limit selected from any of about 0.932 g/cm$^3$, about 0.933 g/cm$^3$, and about 0.934 g/cm$^3$, where any lower limit may be paired with any upper limit. The second polyethylene copolymer is of lower density than the first polyethylene copolymer of the polymer melt blend compositions of the present disclosure.

Further, the second polyethylene copolymer has a melt flow index, measured according to ASTM D1238 at 190° C./2.16 kg, of at least about 17 g/10 min, with ranges from this lower limit to any upper limit being contemplated. In some embodiments, the second polyethylene copolymer has a melt flow index, measured according to ASTM D1238 at 190° C./2.16 kg, that may be in a range having a lower limit selected from any of about 17 g/10 min, about 18 g/10 min, about 19 g/10 min, about 20 g/10 min, about 22 g/10 min, and about 25 g/10 min, to an upper limit selected from any of about 50 g/10 min, about 51 g/10 min, about 52 g/10 min, about 53 g/10 min, about 54 g/10 min, and about 55 g/10 min, where any lower limit may be paired with any upper limit.

In addition, the second polyethylene copolymer of the polymer melt blend compositions has a molecular weight distribution (Mw/Mn, or "MWD"), e.g., Mw/Mn greater than 3, or greater than 3.5 in one or more embodiments, with ranges having any upper limit being contemplated. More particularly, the second polyethylene may have an Mw having a lower limit selected from any of about 30000 g/mol, about 35000 g/mol, and about 40000 g/mol to an upper limit selected from any of about 65000 g/mol, about 70000 g/mol, and about 75000 g/mol, where any lower limit may be paired with any upper limit. In some embodiments, the Mn of the second polyethylene copolymer may have a lower limit selected from any of about 5000 g/mol, about 7000 g/mol, and about 7500 g/mol to an upper limit selected from any of about 17500 g/mol, about 18000 g/mol, and about 20000 g/mol, where any lower limit may be paired with any upper limit. In some embodiments, the Mz of the second polyethylene copolymer may have a lower limit selected from any of about 100000 g/mol, about 125000 g/mol, and about 150000 g/mol to an upper limit selected from any of about 250000 g/mol, about 275000 g/mol, and about 300000 g/mol, where any lower limit may be paired with any upper limit. GPC measurement method is previously disclosed herein.

Industrial methods of producing the second polyethylene copolymer are well known in the art and may include reactor blend, gas phase, liquid phase (or solution), and slurry phase polymerization processes, either alone or in combination. Catalysts used in these processes may include Ziegler-Natta catalysts, and/or one or more single site catalysts, such as metallocenes.

Polymer Melt Blend Compositions

The polyethylene melt blend compositions may include the first polyethylene copolymer in an amount ranging from a lower limit selected from any of about 70%, about 75%, and about 80% based on the total weight of the polymer melt blend composition to an upper limit selected from any of about 85%, about 90%, and about 95% based on the total weight of the polymer melt blend composition, where any lower limit may be paired with any upper limit. Similarly, the polyethylene melt blend compositions may include the second polyethylene copolymer in an amount ranging from a lower limit selected from any of about 5%, about 7.5%, and about 10% based on the total weight of the polymer melt blend composition to an upper limit selected from any of about 25%, about 27.5%, and about 30% based on the total weight of the polymer melt blend composition, where any lower limit may be paired with any upper limit. The first polyethylene copolymer and the second polyethylene copolymer may be melt-blended together, such as in an extruder, to arrive at the polyethylene melt blend compositions of the present disclosure.

Additionally, either or both of the first polyethylene copolymer and the second polyethylene copolymer can be a sub-blend of two or more polyethylenes so long as the sub-blend has the properties described herein.

The weight percentages recited herein for the first and second polyethylene components are based on the total weight (100%) of polymer melt blend composition.

The polymer melt blend compositions may have a density, measured according to ASTM D792, ranging from a lower limit selected from any of about 0.934 g/cm$^3$, about 0.935 g/cm$^3$ and about 0.936 g/cm$^3$ to an upper limit selected from any of about 0.948 g/cm$^3$, about 0.949 g/cm$^3$, and about 0.950 g/cm$^3$, where any lower limit may be paired with any upper limit.

The polymer melt blend compositions may have a difference in the density of the first and second polyethylene copolymers of from about 0.001 to about 0.016 g/cm$^3$, with any ranges within these lower and upper limits being contemplated.

The polymer melt blend compositions may have a melt flow index, measured according to ASTM D1238 at 190° C./2.16 kg, of at least about 6.0 g/10 min, or at least about 6.1 g/10 min, or at least about 6.2 g/10 min, or at least about 6.3 g/10 min, or at least about 6.4 g/10 min, at least about 6.5 g/10 min, with any ranges within these lower limits and any upper limit being contemplated. In some embodiments, the polymer melt blend compositions have a melt flow index, measured according to ASTM D1238 at 190° C./2.16 kg, that may be in a range having a lower limit selected from any of about 6.0 g/10 min, about 6.3 g/10 min and about 6.5 g/10 min, to an upper limit selected from any of about 7.0 g/10 min, about 7.5 g/10 min, and about 8.0 g/10 min, where any lower limit may be paired with any upper limit.

The polymer melt blend compositions may show ARM impact values, as measured according to Low Temperature Impact Test Standard from the Association of Rotational Molders International version 4.0 (2003) on a 3.17 mm thickness sample at −40° C., of at least 55 J, or at least 56 J, or at least 57 J, or at least 58 J, or at least 59 J, or at least 60 J with any ranges within these lower limits and any upper limit being contemplated.

The polymer melt blend compositions may show a flexural modulus at 1% secant, measured according to ASTM D790, of at least about 600 MPa, with any ranges within this lower limit and any upper limit being contemplated.

The polymer melt blend compositions may show an environmental stress cracking resistance, measured according to ASTM D1693 with 100% Igepal on a compression molded plate with 2 mm thickness, 0.3 mm notch and at 50° C., of greater than about 1000 hours, with any ranges within this lower limit and any upper limit being contemplated.

Additives may be used as needed. Typical additives include one or more of antioxidants, anti-static agents, UV stabilizers, foaming agents, processing aids, nucleating agents, nanocomposites, fiber reinforcements and pigments.

Rotomolding of the Polymer Compositions

In some embodiments, a polymer melt blend composition based on a first and second polyethylene copolymers as previously described, may be rotomolded. To this end, the components of the polymer melt blend composition, with or without additives, may be melt blended. The polymer melt blend composition may then be pulverized into powder by using a pulverizer.

In one or more embodiments, polymer melt blend compositions in accordance with the present disclosure may be prepared using continuous or discontinuous extrusion. Methods may use single-, twin- or multi-screw extruders, which may be used at temperatures ranging from 100° C. to 270° C. in some embodiments, and from 140° C. to 230° C. in some embodiments. In some embodiments, raw materials are added to an extruder, simultaneously or sequentially, into the main or secondary feeder in the form of powder, granules, flakes or dispersion in liquids as solutions, emulsions and suspensions of one or more components. Generally melt blend compositions prepared in extruders are further pelletized to be used subsequently used in the rotomolding process.

The pelletized material must be pulverized, to facilitate the flow in the mold, thus reducing air trapping and accelerating the plasticization of the material. The pulverization is carried out in special disc mills where the pellets undergo an ultrafine grind and the powder is separated by sieves until reaching the ideal granulometry. The pulverized powder facilitates the reduction of the rotomolding cycle and prevents polymer degradation.

Prior to the rotational movements, the powder passes through a sintering and coalescence process. Sintering and coalescence steps are important, as it directly reflects on the properties of the rotomolded part and on the process cycle time. They are defined as the formation of a homogeneous melt from the particle coalescence followed by densification. Polymer coalescence only occurs under certain mobility conditions that are only achieved in the molten state. The driving force for sintering is surface tension and the main opposite factor is resistance to flow, viscosity. The polymer melt blend composition may then be rotomolded into articles according to the present disclosure.

In the rotomolding process, the cohesive forces acting on the polymer particles are important during the heating of the powder and the melting phases of the process, since they determine the deposition behavior of the material on the mold wall and the uniformity of the part. The particle size distribution is a determining factor in the properties of the rotomolded part and the economics of the process. The smaller the particle size, the better the heat transfer will be, respecting the pellet grinding limitations. Pulverized powder smaller than 100 mesh size leads to excessive material loss and increased process costs. In addition, the agitation of very fine dust particles inside the mold leads to the accumulation of high electrostatic charges that cause the particles to agglomerate, producing an irregular fusion. According to the French standard NF T50-700 (AFNOR, 2014), the apparent density provides a very useful number of micronized powder performance in the particle packing arrangement. This determines the size and distribution of the bubbles that form along the thickness of the piece. Apparent density values between 0.320 and 0.400 g/cm3 are considered satisfactory. The flowability may be related to the particle shape, the degree of roughness and adhesion to the mold surface. The powder flow time is classified as follows:

Between 22 and 25 seconds is considered satisfactory.
Between 26 and 29 seconds is considered to be reasonably satisfactory.
Greater than or equal to 30 seconds is considered unsatisfactory.

The polymer melt blend composition of the present disclosure may be used to produce rotomolded articles having a density, measured according to ASTM D792, of from about 0.934 g/cm$^3$ to about 0.950 g/cm$^3$, a melt flow index, measured according to ASTM D1238 at 190° C./2.16 kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C. Exemplary articles include, but are not limited to, automotive part, an agricultural vehicle part, such as a part of a tractor or a tractor roof, a tank, a furniture piece or part, or a playground piece or part.

In some embodiments, the polymer melt blend composition of the present disclosure may be used to produce rotomolded articles having a thickness of from about 2 mm to about 4.5 mm, with any ranges within this lower limit and any upper limit being contemplated.

In addition, in some embodiments, the polymer melt blend composition of the present disclosure may be used to produce rotomolded articles having an index of external surface finishing of less than 2 or less than 1, an index of internal surface finishing of less than 2 or less than 1, and an index representative of the bubble content in the article of less than 2, or less than 1, wherein the index of external surface finishing, the index of internal surface finishing, and the index representative of the bubble content each range from 0 to 5, wherein 0 stands for a lack of any defects, 1 stands for a very low amount of defects, 2 stands of a low amount of defects, 3 stands for an intermediate amount of defects, 4 stands for a high amount of defects, and 5 stands for a very high amount of defects, as illustrated in FIGS. 2A-2F.

EXAMPLES

The following examples are merely illustrative, and should not be interpreted as limiting the scope of the present disclosure.

Shown in Table 1 are melt blended compositions used to form two example articles. Both examples were formulated with Braskem ML3602U copolymer (melt flow rate (MFR), measured according to ASTM D1238 (190° C./2.16 kg) of 5.0 g/10 min, and a density of 0.937 g/cm3), Braskem IF33 copolymer (melt flow rate, measured according to ASTM D1238 (190° C./2.16 kg) of 48 g/10 min, and a density of 0.931 g/cm3), and Braskem ML2400N copolymer (melt flow rate, measured according to ASTM D1238 (190° C./2.16 kg) of 20 g/10 min, and a density of 0.926 g/cm3).

TABLE 1

Example Compositions

| Material | Example 1 (wt %) | Example 2 (wt %) |
| --- | --- | --- |
| ML3602U | 80 | 80 |
| IF33 | 20 | — |
| ML2400N | — | 20 |

Some of the physical properties of the melt blended composition were tested by standard methods. The results are compiled in Table 2.

TABLE 2

Physical Properties

| Properties | Standard | Example 1 | Example 2 |
| --- | --- | --- | --- |
| MFR (g/10 min) | ASTM D1238 at 190° C./2.16 kg | 6.8 | 6.6 |
| Density (g/cm$^3$) | ASTM D792 | 0.937 | 0.936 |
| ARM Impact (J) | Low Temperature Impact Test Standard from the Association of Rotational Molders International version 4.0 (2003) in a 3.17 mm thickness sample at −40° C. | 65 | 70 |

In addition, some of the surface finishing properties of the example articles were analyzed by visual evaluation of their surfaces appearance, namely by evaluating the appearance of stamped plates of their external surface A, of their internal surface B, and their appearance resulting from the bubble content in the core C between the external surface and the internal surface of the example articles, as illustrated in FIG. 1. According to this analysis, the surface finishing properties of each sample were classified by visual observation of the defects (or presence of bubbles) according to a numerical indexing system ranging from 0 to 5, wherein 0 stands for a lack of any defects, 1 stands for a very low amount of defects, 2 stands of a low amount of defects, 3 stands for a intermediate amount of defects, 4 stands for a high amount of defects, and 5 stands for a very high amount of defects. The surface analysis was performed in an environment with adequate lighting. FIGS. 2A-2F provide illustrations for each of these numerical standards 0-5 used in the visual evaluation of the internal surface of an article according to the present disclosure. The surface finishing properties of the example articles are compiled in Table 3.

TABLE 3

Surface Finishing Properties of Articles

| Index | Example 1 | Example 2 |
| --- | --- | --- |
| External Surface | 1 | 1 |
| Internal Surface | 0 | 0 |
| Bubble Content | 1 | 1 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A rotomolding polymer melt blend composition comprising:
a first polyethylene copolymer having a density, measured according to ASTM D792, of from about 0.935 g/cm$^3$ to about 0.940 g/cm$^3$, a melt flow index, measured according to ASTM D1238 at 190° C./2.16 kg, of from about 3 g/10 min to about 8 g/10 min, and a molecular weight distribution Mw/Mn greater than 4, wherein the first polyethylene copolymer is present at a concentration of from about 70% by weight to about 95% by weight of the polymer melt blend composition; and
a second polyethylene copolymer having a density, measured according to ASTM D792, of from about 0.924 g/cm$^3$ to about 0.934 g/cm$^3$, a melt flow index, measured according to ASTM D1238 at 190° C./2.16 kg, of at least about 17 g/10 min, and a molecular weight distribution Mw/Mn greater than 3.5, wherein the second polyethylene copolymer is present at a concentration of from about 5% by weight to about 30% by weight of the polymer melt blend composition, wherein the polymer melt blend composition has a density, measured according to ASTM D792, of from about 0.934 g/cm$^3$ to 0.948 g/cm$^3$, a melt flow index, measured according to ASTM D1238 at 190° C./2.16kg, of at least about 6.0 g/10 min, and an ARM impact of at least 55 J measured according to Low Temperature Impact Test Standard from the Association of Rotational Molders International version 4.0 (2003) on a 3.17 mm thickness sample at −40° C.

2. The rotomolding polymer melt blend composition of claim 1 having a flexural modulus at 1% secant, measured according to ASTM D790, of at least 600 MPa.

3. The rotomolding polymer melt blend composition of claim 1, wherein the first polyethylene copolymer and the second polyethylene copolymer are copolymers of ethylene and an alpha-olefin.

4. The rotomolding polymer melt blend composition of claim 1, wherein the first polyethylene copolymer is a copolymer of ethylene and a $C_6$ alpha-olefin.

5. The rotomolding polymer melt blend composition of claim 4, wherein the concentration of the $C_6$ alpha-olefin is from about 2% by weight to about 6% by weight of the first polyethylene copolymer.

6. The rotomolding polymer melt blend composition of claim 1, wherein the first polyethylene copolymer has been polymerized using a Ziegler/Natta catalyst system.

7. The rotomolding polymer melt blend composition of claim 1, wherein the second polyethylene copolymer is a copolymer of ethylene and a $C_4$ alpha-olefin.

8. The rotomolding polymer melt blend composition of claim 7, wherein the concentration of the $C_4$ alpha-olefin is from about 4.5% by weight to about 10.5% by weight of the second polyethylene copolymer.

9. The rotomolding polymer melt blend composition of claim 1, wherein the second polyethylene copolymer has been polymerized using a Ziegler/Natta catalyst system.

10. The rotomolding polymer melt blend composition of claim 1, wherein the melt flow index, measured according to ASTM D1238 at 190° C./2.16kg, of the first polyethylene copolymer is from about 3 g/10 min to about 7 g/10 min.

11. The rotomolding polymer melt blend composition of claim 1, wherein the melt flow index, measured according to ASTM D1238 at 190° C./2.16kg, of the second polyethylene copolymer is from about 17 g/10 min to about 55 g/10 min.

12. The rotomolding polymer melt blend composition of claim 1, wherein the first polyethylene copolymer is present at a concentration of from about 75% by weight to about 95% by weight of the polymer melt blend composition.

13. The rotomolding polymer melt blend composition of claim 1, wherein the second polyethylene copolymer is present at a concentration of from about 5% by weight to about 25% by weight of the polymer melt blend composition.

14. The rotomolding polymer melt blend composition of claim 1, wherein an environmental stress cracking resistance, measured according to ASTM D1693 with 100% Igepal on a compression molded plate with 2 mm thickness, 0.3 mm notch and at 50° C., of greater than 1000 hours.

15. A rotomolding process comprising:
melt blending (a) a first polyethylene copolymer, and (b) a second polyethylene copolymer to form the polymer melt blend composition of claim 1;
pulverizing the melt blend composition; and
rotational molding the polymer melt blend composition.

16. A rotomolded article comprising a polymer melt blend composition of claim 1, wherein the rotomolded article has a thickness of from about 2 mm to about 4.5 mm.

17. The rotomolded article of claim 16, wherein the rotomolded article is an automotive part, an agricultural vehicle part, tank, furniture, or playground piece or part.

18. The rotomolded article of claim 17, wherein the rotomolded article is an agricultural vehicle part selected from the group consisting of a part of a tractor panel or a tractor roof.

* * * * *